(12) United States Patent
Bajekal (10) Patent No.: US 10,623,379 B2
(45) Date of Patent: Apr. 14, 2020

(54) METHOD AND APPARATUS FOR PHYSICAL LAYER SECURITY IN LOW POWER WIRELESS SENSOR NETWORKS

(71) Applicant: Simmonds Precision Products, Inc., Vergennes, VT (US)

(72) Inventor: Sanjay Bajekal, Simsbury, CT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 260 days.

(21) Appl. No.: 15/815,647

(22) Filed: Nov. 16, 2017

(65) Prior Publication Data

US 2019/0149519 A1    May 16, 2019

(51) Int. Cl.
| | |
|---|---|
| *H04L 29/00* | (2006.01) |
| *H04L 29/06* | (2006.01) |
| *H04W 84/18* | (2009.01) |
| *H04W 4/80* | (2018.01) |
| *H04W 12/06* | (2009.01) |

(Continued)

(52) U.S. Cl.
CPC .......... *H04L 63/04* (2013.01); *H04L 63/0876* (2013.01); *H04W 4/80* (2018.02); *H04W 84/18* (2013.01); *H04L 67/12* (2013.01); *H04W 4/33* (2018.02); *H04W 4/48* (2018.02);

(Continued)

(58) Field of Classification Search
CPC ......... H04L 63/04; H04L 63/08; H04L 67/12; H04W 4/80; H04W 4/33; H04W 4/48; H04W 4/70; H04W 84/18; H04W 12/06; H04W 12/08

See application file for complete search history.

(56) References Cited

U.S. PATENT DOCUMENTS

| | | |
|---|---|---|
| 6,904,110 B2 | 6/2005 | Trans et al. |
| 8,433,894 B2 | 4/2013 | Reznik et al. |

(Continued)

OTHER PUBLICATIONS

Gerdes, Ryan M., "Device Identification via Analog Signal Fingerprinting: A Matched Filter Approach", Department of Electrical and Computer Engineering, Iowa State University, 2006, 11 pages.

(Continued)

*Primary Examiner* — Joseph P Hirl
*Assistant Examiner* — Chi D Nguy
(74) *Attorney, Agent, or Firm* — Kinney & Lange, P.A.

(57) ABSTRACT

A system and method for providing physical layer security in a low power wireless communication system utilizing an analog finite impulse response filter to produce an analog representation of the electronic fingerprint that uniquely identifies a transmitting device. A decision logic circuit produces a digital representation of the electronic fingerprint of the RF signal, and digital storage stores the digital fingerprints of trusted wireless nodes. A learning mode allows the storage of digital fingerprints of trusted nodes, and recognition mode permits the passage of the RF signal through a receive-permissive switch only if the digital fingerprint of a trusted wireless node is recognized. One of several triggering events may disable the receive-permissive switch including passage a specified period of time, loss of RF signal for a specified time, reduction in the strength of RF signal below a specified threshold, loss of electrical power, and other system or operator input.

18 Claims, 3 Drawing Sheets

(51) Int. Cl.
 H04W 12/08 (2009.01)
 H04L 29/08 (2006.01)
 H04W 4/70 (2018.01)
 H04W 4/33 (2018.01)
 H04W 4/48 (2018.01)

(52) U.S. Cl.
 CPC .............. *H04W 4/70* (2018.02); *H04W 12/06* (2013.01); *H04W 12/08* (2013.01)

(56) References Cited

U.S. PATENT DOCUMENTS

| | | | |
|---|---|---|---|
| 9,490,977 B2 | 11/2016 | Ye et al. | |
| 2009/0052597 A1* | 2/2009 | Wang | H03F 3/45183 375/350 |
| 2015/0066495 A1* | 3/2015 | Zhang | G10L 15/02 704/231 |
| 2017/0061980 A1* | 3/2017 | Jang | H04R 3/04 |
| 2018/0070381 A1* | 3/2018 | Lei | H04L 1/00 |

OTHER PUBLICATIONS

Lin, Xiaofeng, "A 2.5- to 3.5-Gb/s Adaptive FIR Equalizer With Continuous-Time Wide-Bandwidth Delay Line in 0.25-um CMOS", IEEE Journal of Solid-State Circuits, vol. 41, No. 8, Aug. 2006, 11 pages.

Punskaya, Elena, "Design of FIR Filters", Signal Processing and Communications Laboratory of the Department of Engineering of the University of Cambridge, Jan. 2009, 67 pages.

Polak, Adam C., "Identifying Wireless Users via Transmitter Imperfections", IEEE Journal on Selected Areas in Communications, vol. 29, No. 7, Aug. 2011, 12 pages.

Vandenberghe, L., "Lecture 10 FIR filter design", UCLA Henry Samueli School of Engineering and Applied Science, Fall 2013, 20 pages.

"Technical characteristics and spectrum requirements of Wireless Avionics Intra-Communications systems to support their safe operation", Radiocommunication Sector of International Telecommunications Union, 2014, 73 pages.

Schatz, Glenn, "The Complete List of Wireless IoT Network Protocols", LinkLabs, Feb. 8, 2016, 7 pages.

* cited by examiner

METHOD AND APPARATUS FOR PHYSICAL LAYER SECURITY IN LOW POWER WIRELESS SENSOR NETWORKS

BACKGROUND

Wireless communications occur when two devices communicate with each other by means of electromagnetic radio frequency (RF) emissions between each other through a wireless propagation medium or channel. By its nature, a wireless channel does not need a physical wired connection other than an antenna that couples the communicating devices together by means of the wireless channel. Therefore, a wireless channel is considered open, potentially allowing other devices to attempt to communicate with a wireless device. Wireless communication systems are integral to many devices that utilize external communications, and wireless communications between devices and the internet are becoming increasingly prevalent in many areas. The Internet of Things (IoT), which connects data communications systems to the internet, is becoming an increasingly important architecture for devices to communicate by way of the internet. Many internet-connected devices utilize wireless communications to communicate with a host, base station, or other node. The Wireless Avionics Intra Communication (WAIC) system is being used to interconnect avionics systems and components aboard aircraft. Wireless communication has many advantages, which may include mobility, flexibility, scalability, ease of installation and use, and lower cost. In the case of the WAIC system, additional advantages may include reduced weight (as a result of eliminating cables), and an associated increase in fuel efficiency.

Among the disadvantages of wireless communication, security vulnerability may be one of the most significant. By its very nature, wireless communications are subject to the intrusion of a hostile node other than the trusted node. Spoofing is a term used to describe the process of a bad actor using a hostile base station to mimic the trusted node, thereby inducing a wirelessly-connected device to communicate with the bad actor. By spoofing a device into communicating with a hostile node, the bad actor may gain access to and/or control of the connected device. Because internet-connected devices may be utilized in a multitude of applications, including chemical and industrial processes, security, power generation and distribution, transportation, and health care, a bad actor may be able to inflict unwanted and potentially catastrophic actions in taking control of a connected device.

A typical solution to avoiding spoofing involves the use of encryption, and various methods of encryption have been developed and applied to wireless communications systems. Depending on the level of encryption being deployed in a typical system, either the data payload and/or other key components of a data packet may be encrypted. A particular encryption protocol is called the Advanced Encryption Standard (AES). Using AES, a secure public/private key exchange mechanism is instituted to protect the encryption and decryption keys that are used. A bad actor would need to obtain the private key to compromise an encryption method, thereby obtaining control of the wireless device. Encryption keys may be compromised by a number of ways, including a brute force attack in which different key codes are repeatedly tested to gain entry. The development of longer encryption keys, while offering a potential solution, may have the downside of adding to the overhead used to transmit a data packet, thereby consuming additional RF spectrum and/or requiring additional computational overhead, and accordingly, greater electrical power. Therefore, the continued use of greater encryption with longer encryption keys to prevent spoofing of a wireless device, while providing a solution, may have several disadvantages.

SUMMARY

According to one embodiment of the present disclosure, a system for providing physical layer security in a wireless communication system utilizing an antenna, an RF preamplifier, a receive permissive switch, an analog finite impulse response filter, a decision logic circuit, a digital storage circuit, and an RF receiver. The RF preamplifier receives and amplifies an RF signal from an antenna, where the received RF signal has an electronic fingerprint that uniquely identifies a transmitting device. The receive permissive switch receives an input from the RF preamplifier, the input being an amplified version of the RF signal from the antenna, and the receive permissive switch is configured to electrically connect the amplified version of the RF signal to either the analog finite impulse response filter or the RF receiver. The analog finite impulse response filter includes a first and a second analog delay device, each analog delay device having a time delay, and the output of the first analog delay device is the input to the second analog delay device. The analog finite impulse response filter also includes a first and a second variable gain amplifier, each configured to amplify the signal received at its input with a gain. The input to the first variable gain amplifier is the output of the first analog delay device, and the input to the second variable gain amplifier is the output of the second analog delay device. The analog finite impulse response filter also includes a summing amplifier, whereby the output of each variable gain amplifier is an input to the summing amplifier, and the summing amplifier is configured to sum the signals at its inputs and to produce an amplified signal summation with a gain at the output. The system operates in either a learning mode or a recognition mode. When in the learning mode, the decision logic circuit is configured to receive the amplified signal summation, produce a digital representation of the electronic fingerprint of the received RF signal, and store the digital representation of the electronic fingerprint of the received RF signal in the digital storage circuit. When the system is in a learning mode, the decision logic circuit is configured to compare the digital representation of the electronic fingerprint of the received RF signal to at least one electronic fingerprint stored in the digital storage circuit, and when the comparing of the digital representation of the electronic fingerprint of the received RF signal meets a match requirement to the at least one electronic fingerprints stored in the digital storage circuit, produce a positive indication of a match and command the receive permissive switch to route the amplified version of the RF signal to the RF receiver. If there is not a positive indication of a match, or if any other triggering event occurs, the receive permissive switch routes the amplified version of the RF signal to the analog finite impulse response filter, where it continues to look for a match. The digital storage circuit is configured to store the at least one digital representation of the electronic fingerprint of the received RF signal. The RF receiver is configured to receive an amplified version of the RF signal from the antenna, through the receive permissive switch, and to provide the amplified version of the RF signal to a wireless device.

According to another embodiment of the present disclosure, a method of creating an electronic fingerprint of a received RF signal from a transmitter by receiving the RF signal at an antenna, amplifying the RF signal in a preamplifier, filtering the amplified RF by an analog finite impulse response filter to produce an analog representation of the fingerprint of the RF signal that uniquely identifies the transmitting device, producing a digital representation of the analog representation of the fingerprint of the RF signal by a decision logic circuit, and outputting the digital representation of the fingerprint of the RF signal from the decision logic circuit. The analog finite impulse response filter includes a first and a second analog delay device, each analog delay device having a time delay, and the output of the first analog delay device is the input to the second analog delay device. The analog finite impulse response filter also includes a first and a second variable gain amplifier, each configured to amplify the signal received at its input with a gain. The input to the first variable gain amplifier is the output of the first analog delay device, and the input to the second variable gain amplifier is the output of the second analog delay device. The analog finite impulse response filter also includes a summing amplifier, whereby the output of each variable gain amplifier is an input to the summing amplifier, and the summing amplifier is configured to sum the signals at its inputs and to produce an amplified signal summation with a gain at the output.

According to another embodiment of the present disclosure, a method of providing physical layer security in a wireless communication system by receiving a first RF signal from a transmitter at an antenna, amplifying the first RF signal in a preamplifier, filtering the amplified first RF signal by an analog finite impulse response filter to produce an analog representation of the fingerprint that uniquely identifies a transmitting device of the first RF signal, producing a digital representation of the analog representation of the fingerprint of the first RF signal by a decision logic circuit, outputting the digital representation of the fingerprint of the first RF signal from the decision logic circuit an indication that the first RF signal corresponds to a trusted node, and storing the digital representation of the fingerprint of the first RF signal in an electronic memory if there is an indication that the first RF signal corresponds to a trusted node. The method also includes receiving from a transmitter a second RF signal by an antenna, amplifying the second RF signal by a preamplifier, filtering the amplified second RF signal by an analog finite impulse response filter to produce an analog representation of the fingerprint that uniquely identifies a transmitting device of the second RF signal, producing a digital representation of the analog representation of the fingerprint of the second RF signal by a decision logic circuit, comparing the digital representation of the fingerprint of the second RF signal to the digital representation of the fingerprint of the first RF signal stored in the electronic memory, creating a positive indication in the decision logic circuit if a match exists between the digital representation of the fingerprint of the second RF signal and the digital representation of the fingerprint of the first RF signal stored in the electronic memory. If the match criteria is met, the decision logic circuit outputs an indication that the second RF signal corresponds to a trusted node. If a match exists, an RF receiver is allowed to accept the second amplified RF signal. If a match does not exist, the RF receiver is not allowed to accept the second amplified signal. The analog finite impulse response filter includes a first and a second analog delay device, each analog delay device having a time delay, and the output of the first analog delay device is the input to the second analog delay device. The analog finite impulse response filter also includes a first and a second variable gain amplifier, each configured to amplify the signal received at its input with a gain. The input to the first variable gain amplifier is the output of the first analog delay device, and the input to the second variable gain amplifier is the output of the second analog delay device. The analog finite impulse response filter also includes a summing amplifier, whereby the output of each variable gain amplifier is an input to the summing amplifier, and the summing amplifier is configured to sum the signals at its inputs and to produce an amplified signal summation with a gain at the output.

DETAILED DESCRIPTION

Figure 1A:
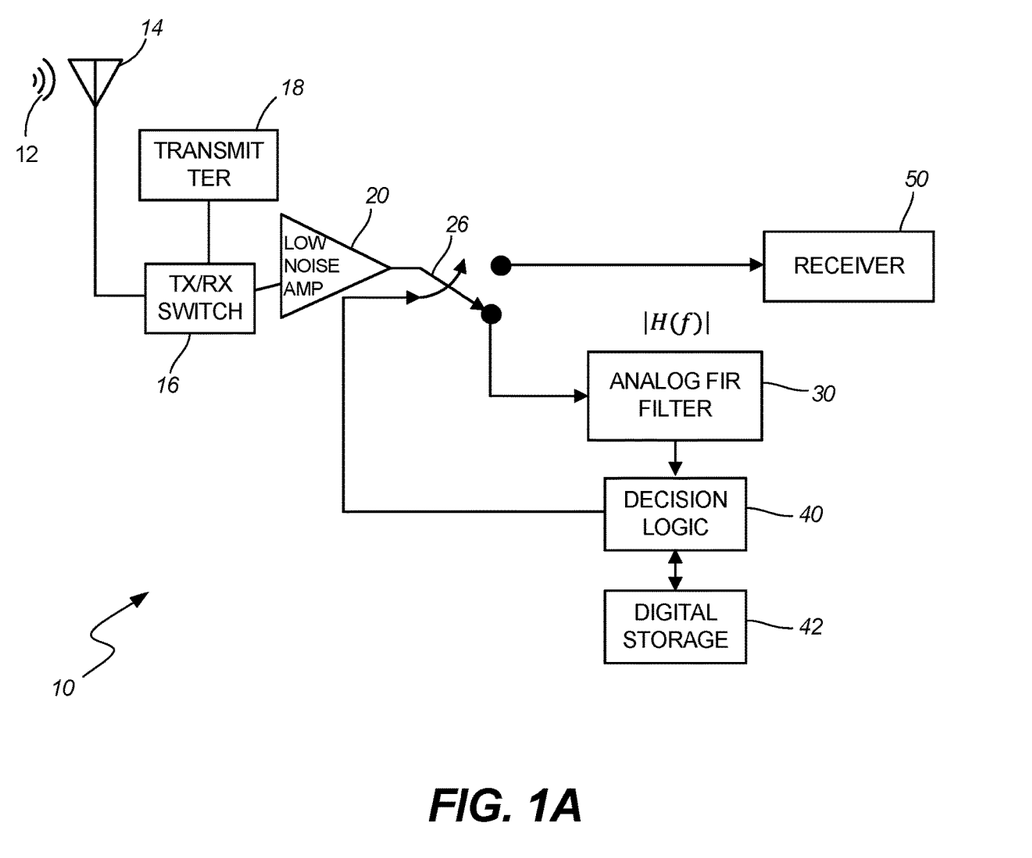
FIG. 1A is a schematic block diagram of the RF analog fingerprinting system of the present disclosure.

FIG. 1A is a schematic block diagram of the RF analog fingerprinting system of the present disclosure. Shown in FIG. 1 are secure wireless communication system 10, RF signal 12, antenna 14, transmit/receive switch 16, transmitter 18, low noise amplifier 20, receive permissive switch 26, analog FIR filter 30, analog time delay 32, variable gain amplifier 34, summing amplifier 38, decision logic 40, digital storage 42, and receiver 50.

In the illustrated embodiment, secure wireless communication system 10 receives a RF signal 12 at antenna 14. RF signal 12 propagates through the medium surrounding antenna 14, thereby forming the propagation channel. In an embodiment, the propagation medium may be air. In other embodiments, the propagation medium may be rarefied air or a vacuum, such as may exist at an elevation above the earth's surface. In some embodiments, the propagation medium may be a fluid such as water, seawater, oil, or fuel. In some embodiments, the propagation medium may include structural components of the items located within a building, vehicle, aircraft, or other structure. In some embodiments, the propagation channel may comprise a combination of more than one particular medium, including, without limitation, any of the aforementioned items. RF signal 12 is an electromagnetic signal which may have one or more frequencies, or may exist within one or more frequency bands. In an embodiment, RF signal 12 may have a frequency of approximately 2.4 GHz, which may be a frequency band that is popularly used in IoT wireless devices. In another embodiment, RF signal 12 may be a frequency band from 4.2-4.4 GHz, which may be a frequency band being utilized by Wireless Avionics Intra Communication (WAIC) components. In another embodiment, RF signal 12 may be a frequency band from 3-30 KHz, which may be a frequency band that is used in water. In other embodiments, RF signal 12 may have any frequency that supports the transmission of data within the electromagnetic spectrum. In an embodiment, RF signal 12 may be a modulated signal, carrying intelligible data by one or more modes of modulation. Examples of modulation modes include, without limitation, amplitude modulation, frequency modulation, phase modulation, and pulse code modulation. In an embodiment, RF signal 12 may comply with one or more Internet of Things (IoT) and/or Wireless Avionics Intra Communications (WAIC) network or system protocols. Examples of IoT network protocols include, without limitation, Bluetooth, Bluetooth Low Energy (BLE), ZigBee, Z-Wave, 6LoWPAN, Thread, WiFi, WiFi-ah, HaLow, 2G-GSM, 3G, 4G, LTE, LTE-M1, Narrow Band (NB) IoT, Near Field Communication (NFC), RFID, SigFox, LoRaWAN, Ingenu, Weightless-N, Weightless-P, Weightless-W, ANT, ANT+, DigiMesh, MiWi, EnOcean, Dash7, and WirelessHART. Examples of WAIC system protocols may include, without limitation, IEEE 802.15.4, IEEE 802.11, WirelessHART, ISA-100.11, and the aforementioned IoT protocol standards. It must be appreciated that the WAIC system is expected to be deployed on future aircraft designs, and system protocols and standards are currently being developed. All data communications systems that use a radio frequency signal are within the scope of the present disclosure.

During the reception process of a wireless signal, RF signal 12 induces a voltage signal upon antenna 14. The voltage signal is conducted through transmit/receive switch 16 into low noise amplifier 20, because secure wireless communication system 10 is in the receive mode. In the illustrated embodiment, secure wireless communication system 10 can also use antenna 14 to transmit. Accordingly, secure wireless communication system 10 can also be used in a transmit mode, whereby transmit/receive switch 16 electrically connects transmitter 18 to antenna 14, thereby allowing transmitter 18 to transmit from antenna 14. In the illustrated embodiment, when secure wireless communication system 10 is in the transmit mode, low noise amplifier 20 is electrically isolated from antenna 14 by transmit/receive switch 16. For the sake of describing the operation of the wireless security system of the present disclosure, the discussion will assume that secure wireless communication system 10 is operating in the receive mode, and therefore, that transmit/receive switch 16 is in the receive mode.

In the illustrated embodiment, low noise amplifier 20 electrically amplifies the received signal from antenna 14 that is routed through transmit/receive switch 16 (being in the receive mode, as described earlier). Low noise amplifier 20 increases the strength of RF signal 12 received at antenna 14 to a voltage level that is sufficient for processing within secure wireless communication system 10, while introducing minimal electrical noise. Low noise amplifier 20 functions as an RF preamplifier, or as a circuit that boosts the level of a received signal. As used in this disclosure, low noise amplifier 20 may also be referred to as a preamplifier. Because the functioning of secure wireless communication system 10 depends on establishing a digital fingerprint that is an accurate representation of RF signal 12, it is desirable that low noise amplifier 20, in the capacity as an RF preamplifier, introduce minimal electrical noise into RF signal 12. In some embodiments, low noise amplifier 20 can introduce no measurable electrical noise into RF signal 12. In other embodiments, low noise amplifier 20 can introduce a measurable level of electrical noise into RF signal 12, however the noise introduced level will be below a value that appreciably degrades the ability of secure wireless communication system 10 to perform digital fingerprinting.

In the illustrated embodiment, low noise amplifier 20 is electrically connected to receive permissive switch 26, with receive permissive switch 26 being in a position to electrically connect the output of low noise amplifier 20 to the input of analog finite impulse response (FIR) filter 30.

Analog FIR filter 30 is an electronic filter whose response to an impulse (an impulse response) is of finite duration because it settles to zero within a finite time. Analog FIR filter 30 produces an output that is a unique representation of the electronic fingerprint of RF signal 12. Analog FIR filter 30 will be described in more detail in FIG. 1B. The output of analog FIR filter 30 is electrically connected to decision logic 40. In the illustrated embodiment, decision logic 40 produces a numerical representation of the electronic fingerprint of RF signal 12.

The operation of secure wireless communication system 10 is dependent on first being exposed to a known safe node, so that the electronic fingerprint of RF signal 12 from a known safe, or trusted, node can be measured, classified, and stored for future use by secure wireless communication system 10. Therefore, when secure wireless communication system 10 is initially set up, the assumption is that there are no known safe nodes. To accept a wireless node as being a safe node, an operator must expose secure wireless communication system 10 to RF signal 12 from a safe node, while invoking a learning mode in decision logic 40. During the learning mode, decision logic 40 produces a numerical representation of the electronic fingerprint of RF signal 12 and stores the numerical representation in digital storage 42. After storing a numerical representation of the electronic fingerprint of RF signal 12 in digital storage 42, the node producing RF signal 12 is recorded as a known safe node. In an embodiment of the present disclosure, digital storage 42 can be nonvolatile memory, thereby allowing the electronic fingerprint to be stored while a power supply to secure wireless communication system 10 is interrupted. In other embodiments, digital storage 42 can be volatile memory, thereby losing the stored electronic fingerprint after the power supply to secure wireless communication system 10 is interrupted.

In the illustrated embodiment, secure wireless communication system 10 can learn to recognize a plurality of known safe nodes. Accordingly, after an operator introduces secure wireless communication system 10 to a first known safe node, thereby allowing a first digital fingerprint to be recorded in digital storage 42, an operator may introduce secure wireless communication system 10 to a second known safe node, thereby allowing a second digital fingerprint to be recorded in digital storage 42. In the illustrated embodiment, secure wireless communication system 10 can store a limitless number of digital fingerprints of known safe nodes. In other embodiments, the number of digital fingerprints representing known safe nodes can be limited by an operator. In some embodiments, an operator can review and selectively remove one or more digital fingerprints of known safe nodes stored in digital storage 42.

In the illustrated embodiment, secure wireless communication system 10 will enter the recognition mode after being introduced to a known safe node. In the recognition mode, receive permissive switch 26 electrically connects the output of low noise amplifier 20 to analog FIR filter 30. When RF signal 12 is received at antenna 14 and transmitted to low noise amplifier 20 via transmit/receive switch 16, analog FIR filter 30 analyzes the digital fingerprint of RF signal 12. Decision logic 40 produces a numerical representation of the digital fingerprint of RF signal 12, and compares the digital fingerprint of RF signal 12 to the plurality of digital fingerprints stored in digital storage 42. If decision logic 40 matches the digital fingerprint of RF signal 12 to at least one digital fingerprints representing a known safe node stored in digital storage 42, then decision logic 40 has determined RF signal 12 being received is from a known safe node, and decision logic 40 commands receive permissive switch 26 to electrically connect the output of low noise amplifier 20 to receiver 50.

In the illustrated embodiment, after receive permissive switch 26 is commanded to electrically connect the output of low noise amplifier 20 to receiver 50, receiver 50 will remain connected to low noise amplifier 20 until a command disconnect event occurs. An operator may set up secure wireless communication system 10 to invoke a command disconnect event for any of the following reasons, without limitation: the passage a specified period of time, a loss of RF signal 12 for a specified period of time, a reduction in the strength of RF signal 12 below a specified threshold, a loss of electrical power, or upon any other triggering event. Upon receiving a command disconnect order, receive permissive switch 26 will electrically disconnect the output of low noise amplifier 20 from receiver 50, and will direct the output of low noise amplifier 20 to analog FIR filter 30. In the illustrated embodiment, secure wireless communication system 10 will return to the recognition mode following the receipt of a command disconnect order. In the recognition mode, secure wireless communication system 10 will resume analyzing the digital fingerprint of received RF signal 12 until the recognition of a known safe node is made, as described above. In a different embodiment, secure wireless communication system 10 will return to the learning mode following the receipt of a command disconnect order. When in the learning mode, secure wireless communication system 10 may require an operator to introduce secure wireless communication system 10 to a known safe node, as described above.

It is appreciated that secure wireless communication system 10 may be deployed in a variety of different situations, as described above. The operator will therefore consider numerous different factors in programming the command disconnect activity of secure wireless communication system 10. For example, if secure wireless communication system 10 is deployed on a wireless device that only intermittently and briefly powers up to connect to the internet, then secure wireless communication system 10 may be programmed to enter the recognition mode following a loss and subsequent resumption of power.

For example, if secure wireless communication system 10 is deployed on a wireless device that is intermittently connected to the internet while being located in a public environment where a spoofer, or other bad actor, could be located, the operator may choose to program secure wireless communication system 10 to command disconnect if the strength of RF signal 12 drops below a specified threshold. In the illustrated embodiment, strength of RF signal 12 can be measured as a signal to noise ratio (SNR), in decibels (dB). Therefore, in the illustrated embodiment, a low SNR may indicate a weakening of the signal strength of RF signal 12, which may be a result of a greater separation distance between the wireless node and secure wireless communication system 10. A low SNR may also indicate an increase in the noise level in the environment, which may be indicative of interfering transmissions, such as a spoofer operating in the environment. In the illustrated example, secure wireless communication system 10 may also be programmed to command disconnect following the passage of a specified period of time. In an embodiment, the programmed period of time may be as short as a few seconds or minutes. In a different embodiment, the programmed period of time may be on the order of hours or days, or longer.

For further example, if secure wireless communication system 10 is deployed on a device that is in nearly continuous communication with a node, an operator may program secure wireless communication system 10 to command disconnect on a loss of power, or perhaps on a loss of received RF signal 12.

In an embodiment, secure wireless communication system 10 may be programmed to follow a command disconnect programming that is adaptive to the environment. For example, if secure wireless communication system 10 is deployed on an aircraft, secure wireless communication system 10 may have an adaptive program that changes depending on whether the aircraft is at an airport or in flight. In the illustrated embodiment, an operator may decide that susceptibility to spoofing is less during flight than when at an airport. Therefore, an operator may program secure wireless communication system 10 to follow a different program for invoking a command disconnect based on parameters that are input by an operator and/or by another system, and/or may be sensed automatically by secure wireless communication system 10.

Figure 1B:
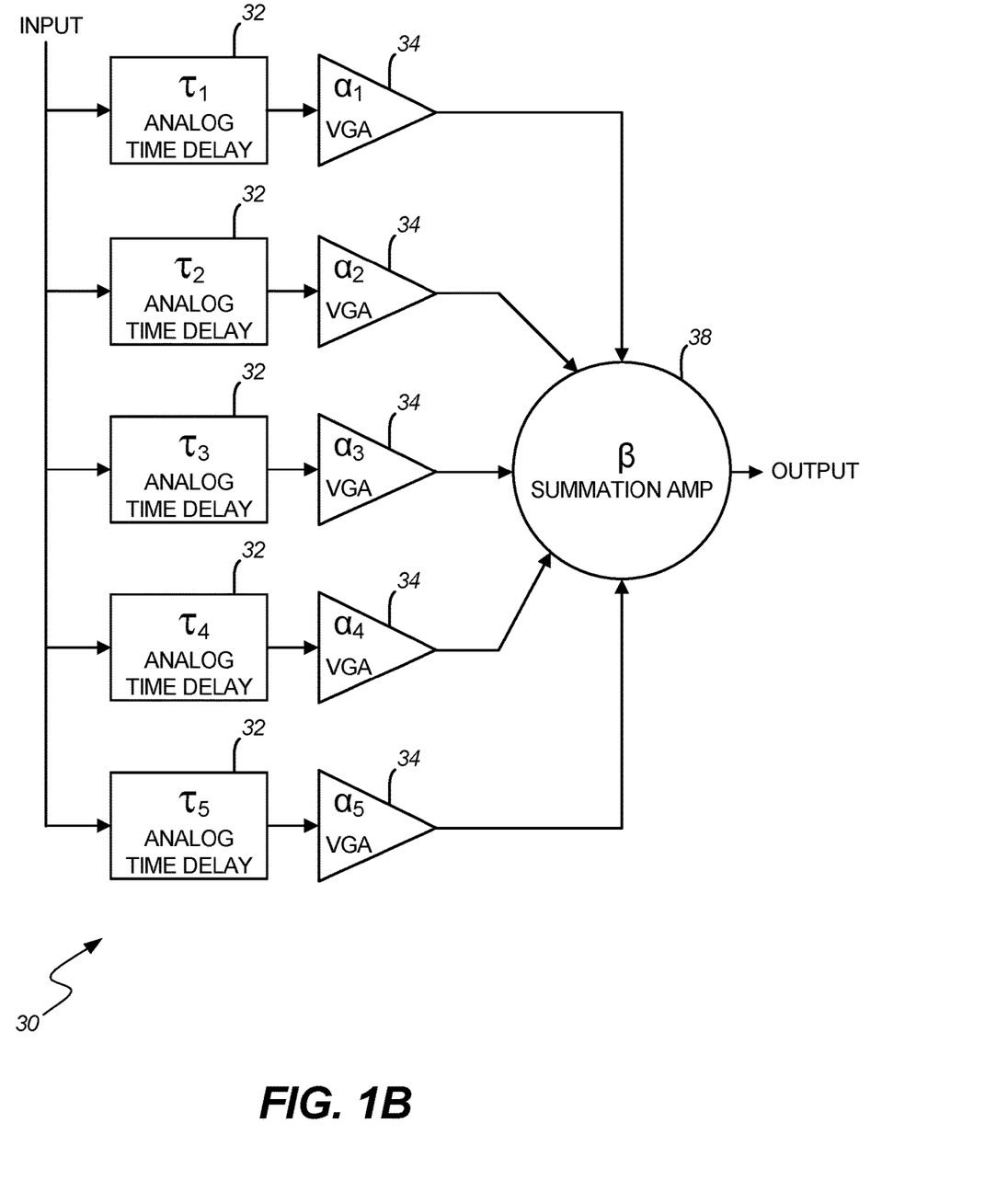
FIG. 1B is a schematic block diagram of the analog FIR filter of the present disclosure.

FIG. 1B is a schematic block diagram of the analog FIR filter of secure wireless communication system 10 that is depicted in FIG. 1A. Shown in FIG. 1B are analog FIR filter 30, analog time delays 32, variable gain amplifiers 34, and summing amplifier 38. In the illustrated embodiment, five analog time delays 32 and five variable gain amplifiers 34 are depicted. In the illustrated embodiment, the output of a first analog time delay 32 provides an input to a first variable gain amplifier 34 and also to a second analog time delay 32, and the output of the first variable gain amplifier 34 provides an input to summing amplifier 38. The pattern repeats for the total number of analog time delays 32 used in the particular embodiment, with the output of each variable gain amplifier 34 providing an input to summing amplifier 38.

In other embodiments, fewer than five analog time delays 32 can be used. In an embodiment, at least two analog time delays 32 will comprise the time delay network of analog FIR filter 30. In some embodiments, analog FIR filter 30 may be comprised of an odd number (e.g., three, five, seven, nine) analog time delays 32. Theoretically, there is no upper limit to the number of analog time delays 32 that can comprise analog FIR filter 30. In some embodiments, more than five analog time delays 32 can be used. A greater number of analog time delays 32 can be beneficial in providing a more detailed digital fingerprint of RF signal 12. However, each increase in the number of analog time delays 32 that comprise analog FIR filter 30 can increase the size, complexity, and/or cost of analog FIR filter 30. Moreover, each increase in the number of analog time delays 32 that comprise analog FIR filter 30 can result in a decreased contribution to the overall quality of the measured digital fingerprint of RF signal 12. In some embodiments, for the foregoing reasons, an optimum number of analog time delays 32 can be determined and used to provide the optimum overall performance of secure wireless communication system 10.

In the illustrated embodiment, each analog time delay 32 has time delay $\tau$. In other embodiments, each analog time delay 32 may have a different time delay. Accordingly, the first analog time delay 32 will have a first time delay $\tau_1$, the second analog time delay 32 will have a second time delay $\tau_2$, and so on. In an embodiment, the first analog time delay 32 may not exist, thereby being represented as analog time delay 32 with time delay $\tau_1$ being zero. In the illustrated embodiment, each variable gain amplifier 34 has corresponding gain $\alpha$. Accordingly, the first variable gain amplifier 34 has gain $\alpha_1$, the second variable gain amplifier 34 has gain $\alpha_2$, and so on. In some embodiments, the gain $\alpha_2$ of the second variable gain amplifier 34 may be less than the gain $\alpha_1$ of the first variable gain amplifier 34, the gain $\alpha_3$ of the third variable gain amplifier 34 may be less than the gain $\alpha_2$ of the second variable gain amplifier 34, and so on. In other embodiments, the gain $\alpha$ of each variable gain amplifier 34 may be the same. Still, in other embodiments, the gain $\alpha$ of each variable gain amplifier 34 may be different from each other, with no relationship existing between the gains $\alpha$ of each subsequent variable gain amplifier 34 in analog FIR filter 30.

In some embodiments, the gains $\alpha$ of each variable gain amplifier 34 can be set in the circuit design. In other embodiments, the gains $\alpha$ of each variable gain amplifier 34 can be programmable by an operator or system controller. In some embodiments, the gains $\alpha$ of each variable gain amplifier 34 can be adaptive to the environment, responding to various parameters that are sensed by secure wireless communication system 10 and/or input by other systems. In other embodiments, the gains $\alpha$ of each variable gain amplifier 34 can depend on the nature of RF signal 12, for example, without limitation, the frequency, data rate, modulation scheme, or network protocol being used by secure wireless communication system 10.

In the illustrated embodiment, the gain of summing amplifier 38 is $\beta$. In some embodiments, the gain $\beta$ of summing amplifier 38 can be set in the circuit design. In other embodiments, the gain $\beta$ of summing amplifier 38 can be programmable by an operator, or can be adaptive to the environment, responding to various parameters that are sensed by secure wireless communication system 10 and/or input by other systems. Summing amplifier 38 linearly combines the individual outputs of each variable gain amplifier 34, producing an overall output while providing gain $\beta$.

Analog FIR filter 30 can be characterized by a transfer function in the frequency domain, denoted as $|H(f)|$. In the illustrated embodiment, transfer function $|H(f)|$ will be a representation of the response of analog FIR filter 30 to RF signal 12 having a particular characteristic. The transfer function $|H(f)|$ of analog FIR filter 30 will produce a particular response in the frequency domain that is representative of the unique characteristics of a particular transmitter which produces RF signal 12. Accordingly, a numerical representation of the transfer function $|H(f)|$ of analog FIR filter 30 applied to RF signal 12 will be a digital fingerprint of RF signal 12. As noted above, the digital fingerprint of RF signal 12 will be dependent on specific circuit properties of the transmitter which produces RF signal 12. No two RF transmitters will produce RF signal 12 having identical digital fingerprints, because of subtle differences that can exist in the electronic circuitry that comprises the RF transmitter.

In the illustrated embodiment, the following equations can be used to describe the theory behind the operation of analog FIR filter 30:

$$H(\omega) = C \frac{A^*(\omega)}{P(\omega)} e^{-j\omega t_0} \quad \text{Equation 1}$$

$$M_{t_0} = H(\omega)B(\omega) = A^*(\omega)e^{-j\omega t_0} B(\omega) \quad \text{Equation 2}$$

$$\mu(t_0) = h(t_0) * \beta(t_0) = \int_{t_0-T}^{t_0} \alpha(\tau)\beta(\tau)d\tau \quad \text{Equation 3}$$

Figure 2:
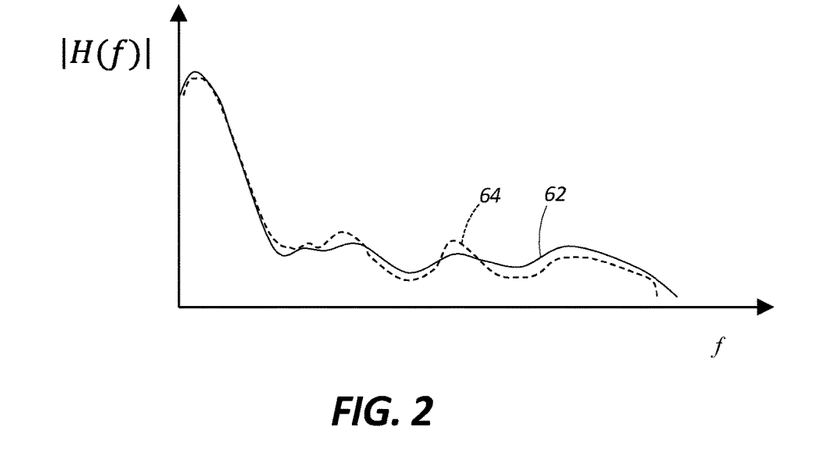
FIG. 2 are representative finger prints of RF signals from a specific RF transmitter and a spoofing RF transmitter that are replicated using the analog FIR filter of the present disclosure.

The terms of equations 1-3 are as follows:

$A^*(\omega)$=Complex conjugate of Fourier transform of known time-domain signal $P(\omega)$=Power spectral density of noise C=Constant $B(\omega)$=Fourier transform of arbitrary input signal $M_{t_0}$=Output of matched filter $\mu(t_0)$=Time domain of matched output FIG. 2 are representative finger prints of an RF signal from a specific RF transmitter and a spoofing RF transmitter that are replicated using the analog FIR filter of the present disclosure. Shown in FIG. 2 is transmitter characteristic plot $|H(f)|$ 62 for a specific transmitter (for example, from a trusted node), and spoofing transmitter characteristic plot $|H(f)|$ 64 for a spoofing transmitter, on frequency domain axes of amplitude vs. frequency. In the illustrated embodiment, numerous identifiable features can exist on transmitter characteristic plot $|H(f)|$ 62 for a specific transmitter. These identifiable features may occur from the various components that comprise a specific transmitter, both individually and in the aggregate. The identifiable features on transmitter characteristic plot $|H(f)|$ 62 represents the fingerprint of a specific transmitter. As described in FIG. 1A, decision logic 40 quantifies these numerous identifiable features, producing a digital fingerprint, or the numerical representation of the fingerprint of RF signal 12. The digital fingerprint of RF signal 12 can be used for learning and/or for transmitter authentication, as described in FIG. 1A.

Also shown on the same set of axes in FIG. 2 is spoofing transmitter characteristic plot $|H(f)|$ 64 for a spoofing transmitter. Subtle but distinct differences are discernable between spoofing transmitter characteristic plot $|H(f)|$ 64 and transmitter characteristic plot $|H(f)|$ 62, even if the spoofing transmitter comprises the same electrical circuit design as the transmitter of the trusted node. After decision logic 40 quantifies the identifiable features of spoofing transmitter characteristic plot $|H(f)|$ 64, thereby producing a digital fingerprint, decision logic 40 will be able to discern between the digital fingerprint of spoofing transmitter characteristic plot $|H(f)|$ 64 and the digital fingerprint of transmitter characteristic plot $|H(f)|$ 62.

As will be described in FIG. 3 below, each base station transmitter has unique characteristics which impart unique characteristics to the RF signal being transmitted from it. Accordingly, after the transmitted RF signal propagates through the transmission channel and is received as RF signal 12 at antenna 14 on secure wireless communication system 10, those unique transmitter characteristics are identifiable by a circuit that is sensitive enough to filter and identify the digital fingerprint of each transmitter, while being able to discern the digital fingerprint from the digital fingerprints of other transmitters. Secure wireless communication system 10 of the present disclosure meets this need. A particular advantage of analog FIR filter 30 of the present disclosure is the ability of secure wireless communication system 10 to perform analog signal processing, classification, and identification in a small, compact, and light weight electronic circuit that draws a relatively small amount of electrical power. In the illustrated embodiment, analog FIR filter 30 can consume less than approximately 0.5 watts of electrical power. This relatively small power consumption enables the use of secure wireless communication system 10 on a mobile platform utilizing an onboard power source.

By contrast to analog FIR filter 10 of the present disclosure, powerful digital signal processing techniques can be utilized to produce a digital FIR filter that is capable of performing similar signal processing and classification. However, a functionally equivalent digital FIR filter utilizing equipment of the prior art can consume approximately 50 watts or more of electrical power, while having a corresponding increase in circuit size, weight, and cooling requirements. Accordingly, a functionally equivalent digital FIR filter may not be suitable for use in applications that require a wireless communications system having equivalent security measures because of the power-prohibitive requirements of the digital FIR filter. Accordingly, secure wireless communication system 10 of the present disclosure may be the only viable solution for many wireless devices where small size, small weight, low energy consumption, and/or low cooling requirements may be required.

Figure 3:
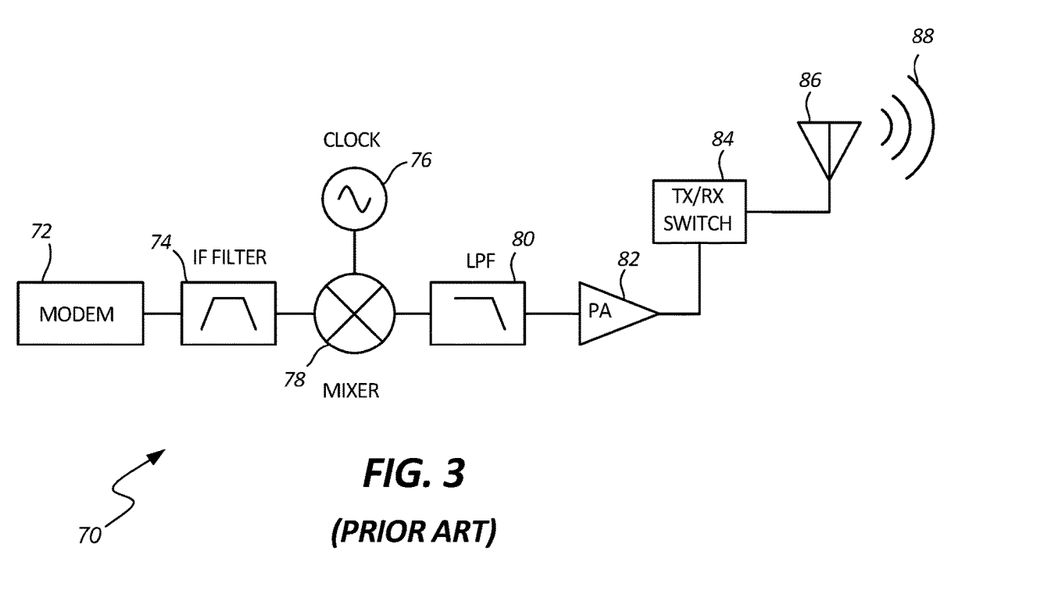
FIG. 3 is a schematic block diagram of a representative known RF transmitter which can produce the representative finger print depicted in FIG. 2.

FIG. 3 is a schematic block diagram of a representative known RF transmitter which can produce the representative fingerprint depicted in FIG. 2. Shown in FIG. 3 are base station 70, modem 72, intermediate frequency (IF) filter 74, clock 76, mixer 78, low pass filter (LPF) 80, power amplifier (PA) 82, transmit/receive switch 84, antenna 86, and RF signal 88. An understanding of base station 70 may be known to those who are skilled in the art of wireless data communication, and will be described briefly as follows. Modem 72 receives digital data from a host computer system (not shown) which is available to communicate with one or more wireless devices. IF filter 74 cleans the digital data provided by modem 72 and removes unwanted frequencies. Clock 76 produces the carrier frequency which may be used to transmit RF signal 88 from base station 70. As described in FIG. 1A, in a particular embodiment, the frequency of clock 76 may be near 2.4 GHz. In other embodiments, the frequency of clock 76 may be less than or greater than 2.4 GHz. Mixer 78 modulates the signal from clock 78 with data provided from modem 72 and filtered by IF filter 74. Power amplifier 82 amplifies the strength of the signal to be transmitted. Transmit/receive switch 84 allows antenna 86 to receive the output of power amplifier 82, for generating RF signal 88 by antenna 86 when base station 70 is in a transmit mode of operation. Because base station 70 can also use antenna 86 to receive wireless signals that are transmitted from another wireless device, transmit/receive switch 84 is used to electrically isolate power amplifier 82 from antenna 86 when base station 70 is in a receive mode. Base station 70 includes a receiver (not shown) which is electrically connected to antenna 86 when base station 70 is in a receive mode. During transmission by base station 70, RF signal 88, being an electromagnetic wave, is produced by antenna 86 and propagates through the medium surrounding antenna 86. RF signal 88, after propagating through the propagation channel that stands between base station 70 and secure wireless communication system 10, becomes RF signal 12 at the point of antenna 14 on secure wireless communication system 10.

In the embodiment illustrated, base station 70 is comprised of several electrical circuits, as described above and as depicted in FIG. 3. Each of those circuits may be comprised of electronic components, devices, connectors, and so on. Operating together, all of the components that comprise base station 70 produce a distinct characteristic on RF signal 88, as transmitted by base station 70. Therefore, RF signal 88 as transmitted from base station 70, has a unique fingerprint. If a wireless communications system that includes the ability to filter, classify, and evaluate the unique fingerprint of base station 70 and compare it with the fingerprint of a known safe wireless node, then spoofing may be avoided.

Discussion of Possible Embodiments

The following are non-exclusive descriptions of possible embodiments of the present invention.

A wireless communication system having physical layer security according to an exemplary embodiment of this present disclosure, among other possible things, includes an antenna; an RF preamplifier, the RF preamplifier having an input and an output; a receive permissive switch, the receive permissive switch having an input and an output; an analog finite impulse response filter, the analog finite impulse response filter having an input and an output; a decision logic circuit; a digital storage circuit; and an RF receiver; wherein the RF preamplifier receives as an input an RF signal from the antenna, the received RF signal having an electronic fingerprint that uniquely identifies a transmitting device, and whereby the RF preamplifier is configured to amplify the RF signal from the antenna; and wherein the receive permissive switch receives an input from the RF preamplifier, the input being an amplified version of the RF signal from the antenna, and wherein the receive permissive switch is configured to electrically connect the amplified version of the RF signal to either the analog finite impulse response filter or the RF receiver; and wherein the analog finite impulse response filter comprises: a first and a second analog delay device, each analog delay device having an input, an output, and a time delay, whereby the output of the first analog delay device is the input to the second analog delay device; a first and a second variable gain amplifier, each variable gain amplifier having an input, an output, and a gain, whereby the input to the first variable gain amplifier is the output of the first analog delay device and the input to the second variable gain amplifier is the output of the second analog delay device, and wherein each variable gain amplifier is configured to amplify the signal received at its input; and a summing amplifier, the summing amplifier having at least two inputs, an output, and a gain, whereby the output of each variable gain amplifier is an input to the summing amplifier.

The wireless communication system of the preceding paragraph can optionally include, additionally and/or alternatively, any one or more of the following features, configurations and/or additional components:

A further embodiment of the foregoing wireless communication system, wherein the decision logic circuit is configured to receive the amplified signal summation; produce a digital representation of the electronic fingerprint of the received RF signal; store the digital representation of the electronic fingerprint of the received RF signal in the digital storage circuit, when the system is in a learning mode; compare the digital representation of the electronic fingerprint of the received RF signal to at least one electronic fingerprint stored in the digital storage circuit, when the system is in a recognition mode; produce a positive indication of a match, when the comparing of the digital representation of the electronic fingerprint of the received RF signal meets a match requirement to the at least one electronic fingerprints stored in the digital storage circuit; and command the receive permissive switch to route the amplified version of the RF signal to: the RF receiver, after there is a positive indication of a match, or the analog finite impulse response filter RF receiver, after there is not a positive indication of a match, or after another triggering event occurs; and wherein the digital storage circuit is configured to store the at least one digital representation of the electronic fingerprint of the received RF signal; and wherein the RF receiver is configured to receive an amplified version of the RF signal from the antenna and to provide the amplified version of the RF signal to a wireless device.

A further embodiment of the foregoing wireless communication system, wherein the analog finite impulse filter is further comprised of at least three analog delay devices and three variable gain amplifiers.

A further embodiment of the foregoing wireless communication system, wherein the first analog delay device has approximately zero time delay.

A further embodiment of the foregoing wireless communication system, wherein the time delay of each analog delay device is shorter than the time delay of the next analog delay device.

A further embodiment of the foregoing wireless communication system, wherein the gain of each variable gain amplifier is approximately the same.

A further embodiment of the foregoing wireless communication system, wherein the gain of each variable gain amplifier is greater than the gain of the next variable gain amplifier.

A further embodiment of the foregoing wireless communication system, wherein the wireless communication system is a component in the Internet of Things.

A further embodiment of the foregoing wireless communication system, wherein the wireless communication system is a component in a Wireless Avionics Intra Communications system.

A further embodiment of the foregoing wireless communication system, wherein the triggering event is selected from the group consisting of: passage a specified period of time, loss of RF signal for a specified period of time, reduction in the strength of RF signal below a specified threshold, loss of electrical power, and trigger input from another system.

A method of creating an electronic fingerprint of a received RF signal, the method comprising: receiving, by an antenna, an RF signal from a transmitter; amplifying, by a preamplifier, the RF signal; filtering, by an analog finite impulse response filter, the amplified RF signal to produce an analog representation of the fingerprint of the RF signal that uniquely identifies the transmitting device; producing, by a decision logic circuit, a digital representation of the analog representation of the fingerprint of the RF signal; and outputting, from the decision logic circuit, the digital representation of the fingerprint of the RF signal; wherein the analog finite impulse response filter comprises: a first and a second analog delay device, each analog delay device having an input, an output, and a time delay, whereby the output of the first analog delay device is the input to the second analog delay device; a first and a second variable gain amplifier, each variable gain amplifier having an input, an output, and a gain, whereby the input to the first variable gain amplifier is the output of the first analog delay device and the input to the second variable gain amplifier is the output of the second analog delay device, and wherein each variable gain amplifier is configured to amplify the signal received at its input; and a summing amplifier, the summing amplifier having at least two inputs, an output, and a gain, whereby the output of each variable gain amplifier is an input to the summing amplifier, and wherein the summing amplifier is configured to sum the signals at the at least two inputs and to produce an amplified signal summation at the output.

The method of the preceding paragraph can optionally include, additionally and/or alternatively, any one or more of the following features, configurations and/or additional components:

A further embodiment of the foregoing method, wherein the analog finite impulse filter is further comprised of at least three analog delay devices and three variable gain amplifiers.

A further embodiment of the foregoing method, wherein the first analog delay device has approximately zero time delay.

A further embodiment of the foregoing method, wherein the time delay of each analog delay device is shorter than the time delay of the next analog delay device.

A further embodiment of the foregoing method, wherein the gain of each variable gain amplifier is approximately the same.

A further embodiment of the foregoing method, wherein the gain of each variable gain amplifier is greater than the gain of the next variable gain amplifier A further embodiment of the foregoing method, further comprising storing, in an electronic memory, the digital representation of the fingerprint of the first RF signal if there is an indication that the first RF signal corresponds to a trusted node; receiving, by an antenna, a second RF signal from a transmitter; amplifying, by a preamplifier, the second RF signal; filtering, by an analog finite impulse response filter, the amplified second RF signal to produce an analog representation of the fingerprint that uniquely identifies a transmitting device of the second RF signal; producing, by a decision logic circuit, a digital representation of the analog representation of the fingerprint of the second RF signal; comparing, in a decision logic circuit, the digital representation of the fingerprint of the second RF signal to the digital representation of the fingerprint of the first RF signal stored in the electronic memory; creating, in the decision logic circuit, a positive indication if the comparing indicates a match between the digital representation of the fingerprint of the second RF signal and the digital representation of the fingerprint of the first RF signal stored in the electronic memory; outputting, from the decision logic circuit, a positive indication that the second RF signal corresponds to a trusted node; allowing an RF receiver to accept the second amplified RF signal after the positive indication exists; and not allowing the RF receiver to accept the second amplified signal if the positive indication does not exist.

A further embodiment of the foregoing method, further comprising not allowing the RF receiver to accept the second amplified signal after a triggering event occurs, wherein the triggering event is selected from the group consisting of: passage a specified period of time, loss of RF signal for a specified period of time, reduction in the strength of RF signal below a specified threshold, loss of electrical power, and trigger input from other system.

A further embodiment of the foregoing method, wherein the wireless communication system is a component in the Internet of Things.

A further embodiment of the foregoing method, wherein the wireless communication system is a component in a Wireless Avionics Intra Communications system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A wireless communication system having physical layer security, the wireless communication system comprising:
   an antenna;
   an RF a radio frequency (RF) preamplifier, the RF preamplifier having an input and an output, wherein the RF preamplifier receives as an input an RF signal from the antenna, the received RF signal having an electronic fingerprint that uniquely identifies a transmitting device, and whereby the RF preamplifier is configured to amplify the RF signal from the antenna;
   an analog finite impulse response filter, the analog finite impulse response filter having an input and an output, the analog finite impulse response filter comprising:
      a first and a second analog delay device, each analog delay device having an input, an output, and a time delay, whereby the output of the first analog delay device is the input to the second analog delay device;
      a first and a second variable gain amplifier, each variable gain amplifier having an input, an output, and a gain, whereby the input to the first variable gain amplifier is the output of the first analog delay device and the input to the second variable gain amplifier is the output of the second analog delay device, and wherein each variable gain amplifier is configured to amplify the signal received at its input; and
      a summing amplifier, the summing amplifier having at least two inputs, an output, and a gain, whereby the output of each variable gain amplifier is an input to the summing amplifier, and wherein the summing amplifier is configured to sum the signals at the at least two inputs and to produce an amplified signal summation at the output;
   a receive permissive switch, the receive permissive switch having an input and an output, wherein:
      the receive permissive switch receives an input from the RF preamplifier, the input being an amplified version of the RF signal from the antenna; and
      the receive permissive switch is configured to electrically connect the amplified version of the RF signal to either the analog finite impulse response filter or the RF receiver;
   a digital storage circuit, configured to store the at least one digital representation of the electronic fingerprint of the received RF signal;
   an RF receiver, configured to receive an amplified version of the RF signal from the antenna and to provide the amplified version of the RF signal to a wireless device; and
   a decision logic circuit, configured to:
      receive the amplified signal summation;
      produce a digital representation of the electronic fingerprint of the received RF signal;
      store the digital representation of the electronic fingerprint of the received RF signal in the digital storage circuit, when the system is in a learning mode;
      compare the digital representation of the electronic fingerprint of the received RF signal to at least one electronic fingerprint stored in the digital storage circuit, when the system is in a recognition mode;
      produce a positive indication of a match, when the comparing of the digital representation of the electronic fingerprint of the received RF signal meets a match requirement to the at least one electronic fingerprints stored in the digital storage circuit; and
      command the receive permissive switch to route the amplified version of the RF signal to:
         the RF receiver, after there is a positive indication of a match, or
         the analog finite impulse response filter, if there is not a positive indication of a match, or after a triggering event occurs.

2. The wireless communication system of claim 1, wherein the analog finite impulse filter is further comprised of at least three analog delay devices and three variable gain amplifiers.

3. The wireless communication system of claim 1, wherein the first analog delay device has approximately zero time delay.

4. The wireless communication system of claim 1, wherein the time delay of each analog delay device is shorter than the time delay of the next analog delay device.

5. The wireless communication system of claim 1, wherein the gain of each variable gain amplifier is approximately the same.

6. The wireless communication system of claim 1, wherein the gain of each variable gain amplifier is greater than the gain of the next variable gain amplifier.

7. The wireless communication system of claim 1, wherein the wireless communication system is a component in an Internet of Things.

8. The wireless communication system of claim 1, wherein the wireless communication system is a component in a Wireless Avionics Intra Communications system.

9. The wireless communication system of claim 1, wherein the triggering event is selected from the group consisting of: passage a specified period of time, loss of RF signal for a specified period of time, reduction in the strength of RF signal below a specified threshold, loss of electrical power, and trigger input from another system.

10. A method of creating an electronic fingerprint of a received radio frequency (RF) signal in a wireless communication system, the method comprising:
   receiving, by an antenna, an RF signal from a transmitter;
   amplifying, by a preamplifier, the RF signal;
   filtering, by an analog finite impulse response filter, the amplified RF signal to produce an analog representation of the fingerprint of the RF signal that uniquely identifies the transmitter, wherein the analog finite impulse response filter comprises:
      a first and a second analog delay device, each analog delay device having an input, an output, and a time delay, whereby the output of the first analog delay device is the input to the second analog delay device;
      a first and a second variable gain amplifier, each variable gain amplifier having an input, an output, and a gain, whereby the input to the first variable gain amplifier is the output of the first analog delay device and the input to the second variable gain amplifier is the output of the second analog delay device, and wherein each variable gain amplifier is configured to amplify the signal received at its input; and
      a summing amplifier, the summing amplifier having at least two inputs, an output, and a gain, whereby the output of each variable gain amplifier is an input to the summing amplifier, and wherein the summing amplifier is configured to sum the at least two inputs and to produce an amplified signal summation at the output;

producing, by a decision logic circuit, a digital representation of the analog representation of the fingerprint of the RF signal;
outputting, from the decision logic circuit, the digital representation of the fingerprint of the RF signal;
receiving, by an antenna, a first RF signal from a transmitter;
storing, in an electronic memory, the digital representation of the fingerprint of the first RF signal if there is an indication that the first RF signal corresponds to a trusted node;
receiving, by the antenna, a second RF signal from the transmitter;
amplifying, by a preamplifier, the second RF signal;
filtering, by an analog finite impulse response filter, the amplified second RF signal to produce an analog representation of the fingerprint that uniquely identifies a transmitting device of the second RF signal;
producing, by a decision logic circuit, a digital representation of the analog representation of the fingerprint of the second RF signal;
comparing, in a decision logic circuit, the digital representation of the fingerprint of the second RF signal to the digital representation of the fingerprint of the first RF signal stored in the electronic memory;
creating, in the decision logic circuit, a positive indication if the comparing indicates a match between the digital representation of the fingerprint of the second RF signal and the digital representation of the fingerprint of the first RF signal stored in the electronic memory;
outputting, from the decision logic circuit, a positive indication that the second RF signal corresponds to a trusted node if a positive indication exists;
allowing an RF receiver to accept the second amplified RF signal after the positive indication exists; and
not allowing the RF receiver to accept the second amplified RF signal if the positive indication does not exist.

11. The method of claim 10, wherein the analog finite impulse filter is further comprised of at least three analog delay devices and three variable gain amplifiers.

12. The method of claim 10, wherein the first analog delay device has approximately zero time delay.

13. The method of claim 10, wherein the time delay of each analog delay device is shorter than the time delay of the next analog delay device.

14. The method of claim 10, wherein the gain of each variable gain amplifier is approximately the same.

15. The method of claim 10, wherein the gain of each variable gain amplifier is greater than the gain of the next variable gain amplifier.

16. The method of claim 10, further comprising not allowing the RF receiver to accept the second amplified RF signal after a triggering event occurs, wherein the triggering event is selected from the group consisting of: passage of a specified period of time, loss of RF signal for a specified period of time, reduction in a strength of RF signal below a specified threshold, loss of electrical power, and trigger input from other system.

17. The method of claim 10, wherein the wireless communication system is a component in an Internet of Things.

18. The method of claim 10, wherein the wireless communication system is a component in a Wireless Avionics Intra Communications system.

* * * * *